(12) United States Patent
Pellenc et al.

(10) Patent No.: US 10,293,447 B2
(45) Date of Patent: May 21, 2019

(54) CONTROL METHOD AND DEVICE FOR POWERED EQUIPMENT

(71) Applicant: PELLENC (Societe Anonyme), Pertuis (FR)

(72) Inventors: Roger Pellenc, Pertuis (FR); Philippe Gilbert, La Puy Sainte Reparade (FR); Bernard Lopez, La Tour d'Aigues (FR)

(73) Assignee: PELLENC (SOCIETE ANONYME), Pertuis (FR)

( * ) Notice: Subject to any disclaimer, the term of this patent is extended or adjusted under 35 U.S.C. 154(b) by 75 days.

(21) Appl. No.: 15/513,284

(22) PCT Filed: Nov. 3, 2015

(86) PCT No.: PCT/FR2015/052963
§ 371 (c)(1),
(2) Date: Mar. 22, 2017

(87) PCT Pub. No.: WO2016/083694
PCT Pub. Date: Jun. 2, 2016

(65) Prior Publication Data
US 2017/0246719 A1 Aug. 31, 2017

(30) Foreign Application Priority Data
Nov. 25, 2014 (FR) .................... 14 61404

(51) Int. Cl.
*B23Q 17/24* (2006.01)
*A01G 3/037* (2006.01)
(Continued)

(52) U.S. Cl.
CPC ............. *B23Q 17/24* (2013.01); *A01G 3/037* (2013.01); *B23D 29/02* (2013.01); *G01B 11/14* (2013.01); *H02P 1/02* (2013.01)

(58) Field of Classification Search
CPC ............ B25F 5/00; B23Q 17/24; B26B 15/00
(Continued)

(56) References Cited

U.S. PATENT DOCUMENTS 5,637,040 A * 6/1997 Kim ......................... F24F 11/00
5,899,807 A * 5/1999 Kim ......................... F24F 11/00

FOREIGN PATENT DOCUMENTS

EP 2156732 A1 2/2010
EP 2163853 A1 3/2010
(Continued)

OTHER PUBLICATIONS

International Search Report for corresponding International Application No. PCT/FR2015/052963.

*Primary Examiner* — Thanh Luu
(74) *Attorney, Agent, or Firm* — Egbert Law Offices, PLLC

(57) ABSTRACT

A control device for a piece of powered equipment having an electronic sensor and an electronic control board for controlling the equipment depending on a control signal from the sensor. The electronic sensor is a contactless optical sensor, provided in an interface area of the control device, configured to measure a distance separating at least one target, located in the interface area, and the optical sensor, the electronic board being configured to establish a first control of a main function of the powered equipment, when a signal from the optical sensor is established for a measured distance within a first range of distances, and to establish a control for at least one additional function of the powered equipment, different from the main function, when a signal from the optical sensor is established for a measured distance greater than the first range of distances.

12 Claims, 2 Drawing Sheets

(51) Int. Cl.
*B23D 29/02* (2006.01)
*G01B 11/14* (2006.01)
*H02P 1/02* (2006.01)

(58) Field of Classification Search
USPC ........................................................ 250/221
See application file for complete search history.

(56) References Cited

FOREIGN PATENT DOCUMENTS

| | | |
|---|---|---|
| EP | 2659765 A1 | 11/2013 |
| FR | 2614568 A1 | 11/1988 |
| FR | 2957834 A1 | 9/2011 |

\* cited by examiner

CONTROL METHOD AND DEVICE FOR POWERED EQUIPMENT

TECHNICAL FIELD

This invention concerns the control of powered equipment. It concerns in particular the control of portable tools, actuated by the user's hand. The invention has applications in gas-powered equipment, such as chain saws, or electric motor equipment power-supplied by the mains, by a battery inserted into the body of the tool, or by a battery located remotely, which can be carried by the user. The targeted equipment or tools may include pruning shears, sheet metal snips, hedge trimmers, blowers, brush cutters, olive combs and lawn mowers, whether gas-powered or electric. In general, the invention has applications in any type of powered tools in the professional fields of green space maintenance, construction or medical field. It also has applications for tools designed for the public, and for household appliances.

STATE OF THE ART

The above-mentioned pieces of equipment have in common a motor and a motor control element that can be actuated by the hand or finger of the user, or even by his foot.

Although some tools operate using just a switch that allows for the start or shut-off of the motor through a singular and momentary action of the foot, hand or finger on the switch, most of them are equipped with a more sophisticated control device. For example, such device can be a control trigger that can be operated using one or more fingers, from a rest position when no action is exercised on the trigger to a maximum stroke position representing the end of stroke of the trigger. This type of trigger is generally provided with means for its automatic return to the rest position as soon as the action on the trigger is stopped. The return means are most of the time elastic, such as a spring. The same applies to control elements activated by the users foot, when the trigger is then replaced by a pedal. The description below makes reference to a hand-actuated control element. However, it should be pointed out that a foot-actuated control element may have the same functional capabilities. On the other hand, the tool or machine may also have different functional capabilities. For example, these may be non-portable pieces of equipment.

In general, a rest mode of the motor corresponds to the rest position of the trigger. This may correspond to the shutdown mode for an electric motor, or to the idle mode for a gas-powered motor. Inversely, for the maximum stroke position of the trigger, the motor works generally at a predefined maximum power. In intermediate positions of the trigger, the motor runs at an intermediate power that is in proportion or not to the depression of the trigger. This is the case, for example, of gas-powered chain saws where the motor is idling whenever the trigger is in rest position and runs at its predefined maximum power whenever the trigger is in maximum stroke position. In the special example of a chain saw, the motor drives an active element that happens to be the chain saw chain.

Thus, in the same manner, the ultimate function of the powered equipment or tool control element is to regulate the movements of the corresponding active element.

In spite of the continuous rotation of the motor when actuating the control element, the active elements of a portable tool are not necessarily rotating. As a matter of fact, a given position of the trigger can simply be associated with a corresponding position of the portable tool active element. Thus, the active element has a rest position corresponding to the trigger in rest position, a maximum stroke position when the trigger is in maximum stroke position, and an intermediate position between its rest position and its maximum stroke position corresponding to an intermediate position of the trigger. This is the case, for example, with an electric pruning shear as described in document FR2614568 of the applicant. Such pruning shear features an active cutting element with one fixed blade and one movable blade. The movable blade is actuated by an electric motor. A trigger is used to control the position of the movable blade in relation to the fixed blade between a fully open position that is a rest position, and a closed position that allows the movable blade to lap over the fixed blade for the cutting action. The position of the movable blade is thus tied to the relative position of the trigger between its rest position and its maximum stroke position. It can then be continuously controlled by the user who actuates the trigger with one finger or his hand. More precisely, the trigger controls the motor rotation in a rotation direction, or in a reverse direction depending on the trigger actuation direction. The motor is connected to a cam of the movable blade through a gear that converts the motor rotation into a translation movement. The translation movement applied to the cam causes the opening and closing of the movable blade.

In addition, a number of tools make it possible for the user to control additional functions, such as the predefined maximum power of the motor, the maximum stroke position of the active element, the standby mode of the tool, etc.

For illustration purposes, document FR2973815 of the applicant describes a portable power blower with the air speed adjusted by the position of the trigger located below the blower handle. An additional pushbutton located above the handle acts on the selection of the maximum air speed at the blower outlet by limiting the maximum power developed by the motor. The button can be actuated by a second finger on the hand that actuates the trigger. However, this requires special attention by the user who must coordinate the movement of a second finger on his hand to apply an additional effort in a direction that proves to be opposing to the effort applied on the trigger.

Document EP2156732 of the applicant describes a power pruning shear that includes a main trigger and a second trigger connected to the main trigger. The second trigger can be actuated by the same finger as the main trigger. It controls at least one additional function of the tool, such as a change of maximum stroke position of the movable blade in relation to the fixed blade. The actuation of the second trigger requires from the user to move his finger on the main trigger in a direction that allows for the movement of the second trigger, i.e., in a direction roughly perpendicular to the movement of the main trigger. Such movement is not in continuity with the finger movement to actuate the main function and thus causes a certain hindrance and loss of time for the user.

Document EP2659765 describes a portable power tool, such as an electric pruning shear with a control system designed to detect a predefined movement sequence of the trigger, for example, a double quick actuation of the trigger. An additional function is in this case the detection of the predefined sequence. The user must thus coordinate quick finger effort sequences to achieve the desired additional function. Such exercise is not part of a natural movement of the finger on the hand due to the frequency changes of actuation of the trigger, and, if repeated often, it can cause harm to the finger, or even to the hand.

DISCLOSURE OF THE INVENTION

The invention intends to overcome the disadvantages described above. It also intends to provide a control method and device for powered equipment, and more specifically for a portable tool making it easy to use a dual control. The purpose of the invention is also to propose a control device with multiple control, compatible with a natural movement of the hand or of the finger actuating a main function.

In order to achieve these goals, the invention proposes more specifically a control device for powered equipment, comprising at least an electronic sensor and an electronic control board for controlling the equipment based on at least one control signal from the sensor. According to the invention, the electronic sensor is a contactless optical sensor provided in an interface area of the control device. It is configured to measure a distance separating it from a target located in the interface area. The electronic board is configured to establish a first control of a main function of the powered equipment when a signal from the optical sensor is established for a measured distance within at least a first range of distances, and to establish a control for at least an additional function of the powered equipment, different from the main function, when a signal from the optical sensor is established for a measured distance greater than the first range of distances.

The control device under the invention may be suited for any equipment equipped with an electric or gas-powered motor. The equipment may be fixed or portable equipment.

The electronic board receives a control signal from the optical sensor. This does not prejudge the form of the signal. It may be a more or less complex, analog or digital signal. It may also just be a current or voltage representative of the distance measurement.

A type of contactless optical sensor that can be used in the control device is commercially available from Avago Technologies company under reference APDS-9190. Such sensor has a radiation source, such as a light-emitting diode that emits within the near infrared spectrum. The light emitted by the source lights up the target. Part of the light backscattered by the target is received and measured by a photodetector, comprising one or more photodiodes. The part of light received by the diodes varies inversely to the distance separating the target from the photodetector, in this case the photodiodes. The measurement light can be adjusted so as to more easily eliminate the influence of the ambient light.

It should be noted here that the target aimed at by the optical sensor can be a finger of the user, with or without glove; the hand of the user, with or without glove; or in special applications, the foot of the user, with or without shoe. The target may also be a control element, i.e., a trigger or a pedal.

Thus, the interface area of the control device is located within the measurement field of the optical sensor, i.e., the measurement and capture light emitting field for the backscattered light. The interface area is preferably materially delineated by a guard providing an actuation space around the sensor. The actuation space is sized so as to receive the target with a sufficient movement capability to carry out the controls, i.e., larger than the first range of distances.

In the first range of distances, the closest one to the control sensor, the sensor signal can be used by the electronic board to establish a first control of a main function; it can typically be a control of the motor, such as its rotation speed.

For example, a motor shutdown, especially in the case of an electric motor, or an idling of the motor, in the case of a gas-powered motor, can correspond to a target positioned at the end of the first range of distances, i.e., the greatest distance of that range. This distance is designated as "maximum proximate distance" hereinafter. On the other hand, a rotation at a predefined maximum set speed of the motor can correspond to a target positioned closest to the sensor, i.e., at the smallest distance in the first range of distances. This distance is designated as "minimum proximate distance" hereinafter. Intermediate rotation speeds between shutdown and maximum rotation set speed can correspond to intermediate positions of the target, i.e., between the minimum proximate distance and the maximum proximate distance. The motor rotation speed can be in proportion or not to the distance measured by the sensor The first control of a main function of the equipment established by the board from the sensor signal is not necessarily a motor speed control, but can be the relative position of an active element. An illustration thereof can be given by a pruning shear with a movable blade between an open position and a closed position on a fixed blade. The open position corresponds for example to a target located at the maximum proximate distance from the sensor while the closed position corresponds to a target located at the minimum proximate distance from the sensor. Intermediate positions of the blade between its open position and its closed position can correspond to the intermediate distances of the target. Said intermediate positions can correspond to opening angles in proportion or not to the distance of the target. According to another operating mode, it is possible to provide for threshold distances between the minimum and maximum proximate distance. In this case, the target going through the threshold distances causes a brusque automatic closing or opening movement of the blade.

It is possible to configure the electronic board to differentiate several ranges of distances of the target for which one or more different controls of a main function can be established. However, the actuation of such control can be delicate for a user without experience. Therefore, in a preferred embodiment of the invention, only one "first range of distances" is provided for.

As above-mentioned, the additional function control is established for distances greater than the first range of distances, i.e., when the target is far from the sensor by a distance greater than the above-stated maximum proximate distance. The additional function is preferably a function that does not concerns directly the rotation speed of the motor, or the position of the active element, but rather a rotation mode, or an operating mode of the active element. For example, the additional function can be a control of the motor maximum rotation speed setpoint. Thus, an excursion of the target beyond the first range of distances can cause a change of setpoint. It can for example be the switching from a first maximum speed setpoint to another maximum speed setpoint of the motor, for example to a greater maximum speed setpoint of the motor.

This then causes the motor to reach a greater rotation speed with the control of the main function, especially when the target is at the minimum proximate distance. A new excursion of the target beyond the first range of distances can either cause a return to the first maximum speed setpoint, or cause the selection of another lower or greater maximum speed setpoint.

The control for the additional function under the invention can also be an operating mode change control. It is, for example, the switching from an on/off operation to a proportional operation, or vice versa. In the case of a pruning shear, the control of the additional function can be the switching from a progressive dosing control of the blade to a threshold closing control. In this case also, the change of operating mode can be caused by an excursion of the target beyond the first range of distances.

While remaining within the context of an application to pruning shears or to sheet metal snips, the control of the additional function can also correspond to a maximum opening setpoint of the jaw, or to a maximum pivoting setpoint of the movable blade in relation to the fixed blade. Thus, an excursion of the target beyond the first range of distances makes it possible to increase the maximum opening of the blade in its rest position. A new excursion of the target beyond the first range of distances can either cause a return to the first maximum opening setpoint, or cause the selection of another lower or greater maximum opening setpoint.

According to another possibility, the control for an additional function can correspond to a safety control of the equipment or of the tool, for example, through an instant shutdown of the motor, or the actuation of an emergency brake or the locking of the active element.

The additional function can also be a reversing control of the direction of rotation of the motor, or of the direction of actuation of the active element. Such function can be useful, for example, on a hedge trimmer in the event that the blades lock.

As briefly stated above, and according to a special embodiment of the invention, the control device can comprise a control element provided in the interface area, and a position sensor linked to the control element, the position sensor being also connected to the control electronic board.

The control element can for example by a trigger or a pedal that can be actuated by hand, by foot, or by a finger. The linear or angular position sensor is, for example, a potentiometer, a hall effect sensor, or a magnetoresistor, and provides the electronic board with a signal measuring the relative position of the control element. The signal can be a more or less sophisticated, analog or digital signal. It can also be just a current or voltage signal, or a resistance value measurement signal.

In addition to its function to provide means of actuation for the user, the presence of a control element such as a trigger, also has an indexing function to facilitate the intuitive positioning of the user's finger or hand. The control element also facilitates the perception of the first area of distances if the control element has a stroke that corresponds to that area of distances. The control element in rest position can also be used as reference for automatic calibration of the first range of distances. Finally, the control element, either spring-loaded or tied to the movement of the active element, also provides a force return for the user. These characteristics increase the user comfort, especially for users who are not familiar with the interface. Finally, and as it appears in the further description, a sensor linked to the control element can furnish a useful signal for the establishment of a control.

It is also possible to provide in the interface area for a dummy control element, i.e., an element that is not connected to any sensor or actuator, but is simply used to furnish some indexing for the position of the user member, indexing of the first range of distances and possibly a force return.

The additional control element does not hinder the control established based on the distance measurement of the contactless optical sensor. On the contrary, it can be associated to it.

Whenever the control element comprises a trigger that can be actuated by the user's finger and no interaction is desired between the trigger and the distance measurement of the distance sensor, the trigger can be located outside the field of measurement of the sensor. Whenever it is difficult to place the trigger outside the field of measurement of the optical sensor, for example, for space reasons, it can also be placed within the field of measurement. In this case, the trigger can be used as a target in the first range of distances. The trigger can also be provided with an opening in a support area for the user's finger, said opening being aligned on the optimum field of measurement of the optical sensor. The measurement can be done on the finger through the opening. The finger is then the target.

Based on the configuration and type of sensor used, the measurement can also be made in lateral areas in the immediate vicinity of the trigger that remain sensitive for the sensor. In this case, the sensor can also detect the presence of the user's finger. In addition, to prevent possible interferences of the trigger with the measurement, said measurement can be done in a suitable color, such as a dark, even black color, at least in the part around the opening, so as not to disturb the measurement light signal.

The control element, whether it is a target or not for the distance sensor, has preferably a maximum stroke corresponding to the first range of distances. Whenever the control element is a trigger, its released rest position corresponds preferably to the maximum proximate distance of the target and its depressed end of stroke position to the minimum proximate distance of the target, according to the terms defined above. In addition, the position of the user's finger on the trigger in rest position can be used for permanent calibration of the rest position according to the color and finger reflection characteristics. The calibration done by the electronic board permits to clearly identify the distance of the finger from the rest position, and outside the first range of distances.

While the optical sensor permits to determine whether a control of the main function or a control of the additional function should be established, it is to be noted that the control of the main function is not necessarily established from the signal of the optical sensor. As a matter of fact, the electronic board can be configured to establish the first control of the main function of the powered equipment either from an optical sensor signal, or from a signal of another sensor, and in particular, from the position sensor of the control element (trigger). The electronic board can also be configured to establish the first control of the main function from the signals of both sensors.

In particular, the electronic board can be configured to establish the first control of the main function of the powered equipment from the optical sensor signal, and a second control of the main function of the powered equipment from the signal of the position sensor of the control element.

The existence of a redundant control for one single function can be useful for equipment where the safety and reliability of the control are critical. The electronic board, or more specifically a board processor, can also be configured to compare the first and the second controls of the main function, and to activate the equipment safety procedure in case of any divergence of the first and the second controls. The safety procedure may include the activation of a brake acting on the active element or the motor, and the shut-off of the motor power supply. For example, in the case of the control of a gas-powered chainsaw, if the motor is in idle position and the user does not have his finger on the trigger, the accidental presence of a foreign body, such as a branch within the interface area, can actuate the trigger. Detection by the optical sensor of a foreign body actuating the trigger, i.e., a body that does not have the color or user's finger reflection characteristics, can then be used to inhibit the sensor signal connected to the trigger.

The control device under the invention is especially suited for portable power tools, with a built-in or remote battery, comprising a movable active element, preferably a cutting element, and a gear connecting the motor to the active element.

The invention concerns also a control method for powered equipment equipped with a control interface with optical sensor capable of measuring the distance of a target. The method concerns also the establishment of a first control for the main function of the powered equipment whenever the target is far from the sensor by a distance within a first range of distances. The method concerns also the establishment of a control for at least one additional function of the powered equipment, different from the main function, whenever the target is far from the sensor by a distance greater than the first range of distances.

The control target can be, as described above, a finger of the user.

According to a special implementation of the method, the main function control is established from a distance measurement signal established by the optical sensor, and/or from a signal established by a position sensor linked to a control element of the control interface. The control can also be established based on a combination of those signals. The combination of these signals can be used for the safety mode of the tool in the manner indicated above. The control element can be the already mentioned trigger.

The following description of the figures shows other characteristics and advantages of the invention. This description is given for illustration purposes and is not exhaustive.

DETAILED DESCRIPTION OF MODES OF IMPLEMENTATION OF THE INVENTION

Figure 1:
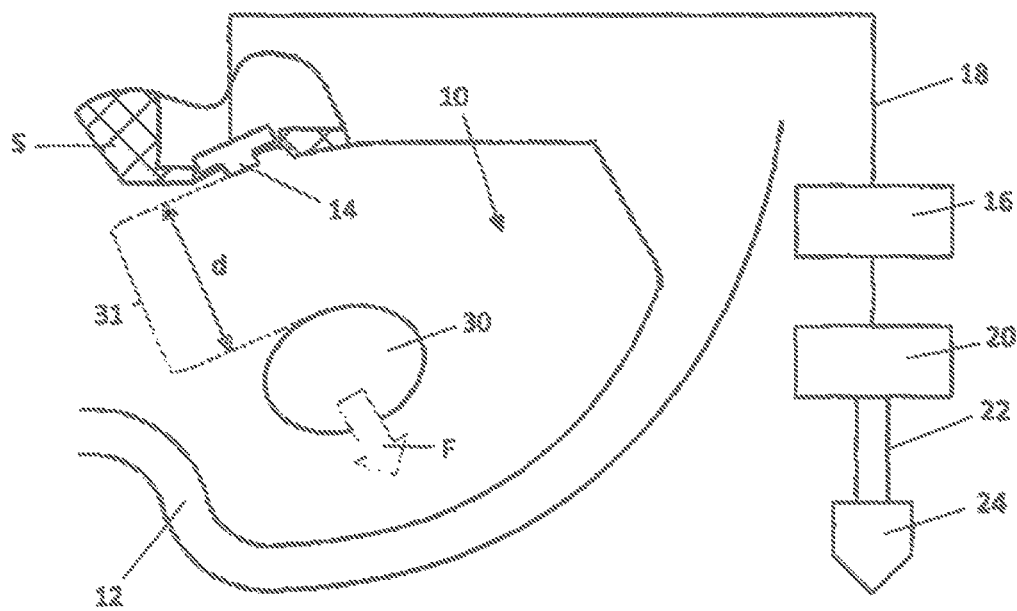
FIG. 1 is a schematic representation of a control device under the invention.

In the following description, with reference to the figures on the drawings, identical or similar parts are identified with the same reference characters so that it is possible to refer from one figure to the next.

The control device in FIG. 1 is used to control a portable tool S shown only in part. It shows an interface area 10, delineated by a guard 12, and the measurement field of an optical sensor 14 provided in the body of tool S. The sensor is connected to an electronic board 16 through an electric connection 18. The electric connection 8, for example of the serial type, provides power supply for the sensor and transmits a measurement signal to the electronic board 16. If applicable, the electronic board 16 can comprise a power supply for the optical sensor 14.

The electronic board provides a control for a motor 20 shown very schematically. It can be a power supply from a battery not shown, controlled and applied to the different phases of an electric motor. It can also be an intake control of a gas-powered motor. The motor 20 is connected to an active element 24 of the tool through a gear 22. The gear is also designed to convert the rotation of the motor into an adequate movement to actuate the active element. The active element can be, for example, a cutting tool.

The electronic board 16, motor 20, gear 22, and active element 24, shown very schematically on FIG. 1, are built into the equipment or tool S of which they are an integral part.

The reference 30 designates a measurement target for which sensor 14 measures the distance away. In the example of the figure, it is a finger of the user. It is for example a finger on the hand that grasps the tool or a handle on the tool not shown.

The target 30 is shown on the figure at a distance d, indicated by a double arrow, which separates the target from the sensor, or more specifically which separates it from the body of the tool at the location of the sensor. The distance d corresponds to the maximum proximate distance mentioned in the first part of the description, i.e., the greatest separation distance from the first range of distances 31. The first range of distances 31, which governs the establishment of a control of the main function of the tool, extends from a minimum value to maximum value d. The minimum value, which can be zero, corresponds to the measured distance when the target 30 is the closest to the sensor 14, for example against the sensor, or against the wall of the structure including the sensor. The maximum value, in the first range of distances, is distance d, in this case the maximum proximate distance. In that range, the movement of the target can be used to establish the control of the main function. It can for example be a progressive control of the speed of the motor 20 or a control of the stroke of a cutting element. One can refer to the above description in that regard.

An arrow F indicates a possible excursion of the target outside the first range of distances 31, while remaining within the measurement field of the sensor and within the interface area 10. The separation between the target 30 and the sensor 14 becomes then, at least for a moment, greater than the value of the distance d. The measurement signal for a distance greater than distance d, established by the sensor, is used by the electronic board 16 to establish an additional control. Here again, and with reference to the above description, it can be for example, a modification of an operating setpoint, of a position setpoint of a cutting element, or of a rotation speed setpoint of the motor.

Figure 2:
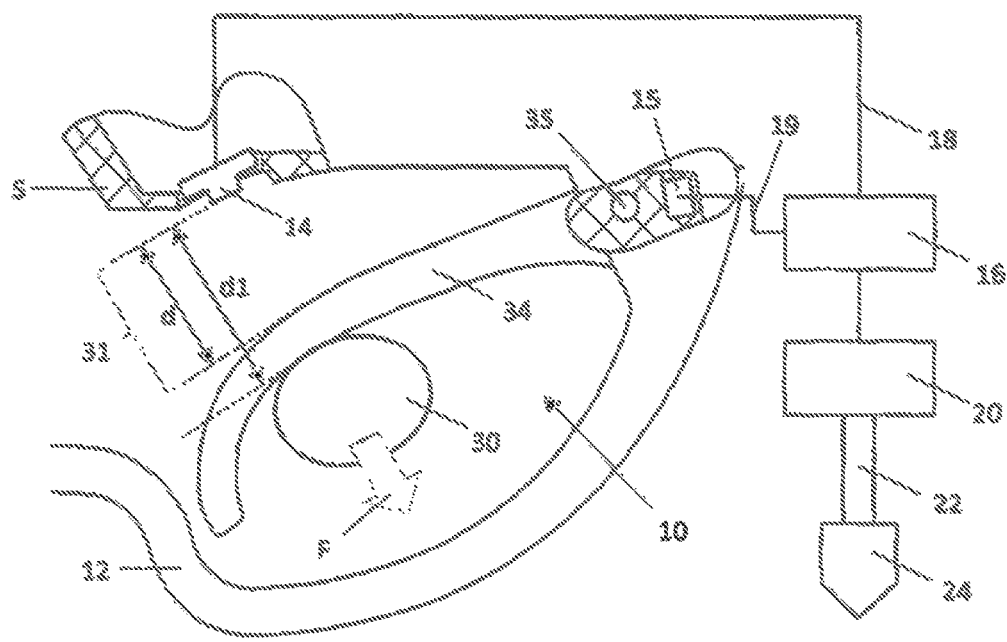
FIG. 2 shows the device from FIG. 1 equipped with a trigger.

FIG. 2 shows a control device similar to FIG. 1, but which is equipped with a control element in the interface area 10. In the example on the figure, this is a trigger 34 that can be actuated by a finger of the user.

The relative arrangement of the sensor 14 and the trigger 34 is such that the measurement field is focused on the trigger 34. Thus, the trigger, or at least part of the end of the trigger in the measurement field of the sensor, makes up the target. The distance measured by the optical sensor is no longer the separation from the finger but from the trigger.

Since the trigger is used as a measurement target for the optical sensor 14, its rest position can be used as reference for automatic calibration of the maximum value d of the first range of distances. The trigger cannot be further away from the sensor 14 outside the first range of distances, to activate the control of the additional function. In such embodiment of the control element, the measurement field of sensor 14 can however be designed sufficiently wide to detect the presence of a finger at the trigger. This permits to define a distance d1 that corresponds to the finger positioned on the trigger in rest position at the distance d. The difference between the distance d1 and the distance d corresponds simply to the thickness of the trigger. Thus, in spite of the impossibility to move the trigger beyond the distance d, detection of the finger position beyond the distance d1 can be used to activate the additional function.

Preferably, the trigger is provided in its center with an opening or slot, enabling the sensor 14 to establish in a direct and more reliable manner the distance d1, while being capable of calibrating the distance d. The distance d1 can also be established directly through calculation in the electronic board by parameterizing the thickness characteristics of the trigger.

The trigger 34 can also be a dummy control. It can for example be mounted in a pivoting manner on a pivot 35 and comprise at that level an elastic return system, known as a spring. It can also be used as a target or reference mark for the user's finger. It can also be a force return that enables the user to better be aware of the position of his finger.

The trigger can also be connected to a position sensor 15, for example, a sensor measuring its angular stroke around the pivot 35. The sensor 15 is then connected to the electronic board through a proper electrical connection 19, through which it provides the electronic board 16 with a measurement signal. Thus, the electronic board 16 can be configured to establish the motor control, and especially the control of the main function, either from the signal of the trigger sensor, or from the optical sensor signal. Both signals can be used in the manner described above.

Figure 3:
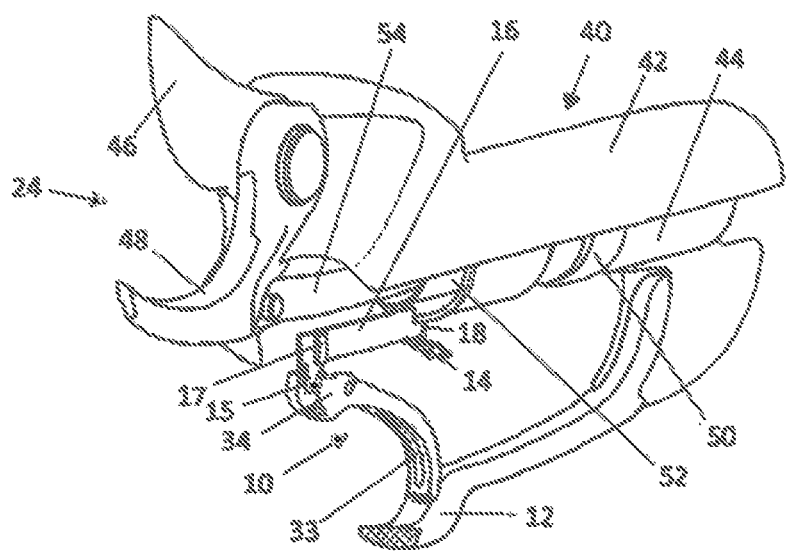
FIG. 3 is a view, with a partial cutaway of its lower part, of a pruning shear using a control device according to the invention.

FIG. 3 shows an improved embodiment of the control device applied to a pruning shear 40.

The control device is equipped with a trigger 34 that, just like the interface area 10, is located close to a part of the casing forming a handle 42 for the pruning shear. Thus, the user's finger, used as target, can be a finger on the hand that grasps the handle 42.

FIG. 3 shows in partial cutaway, an electric motor 44, and a gear connecting the motor to a movable blade 46 on the pruning shear. The movable blade 46, together with a fixed blade 48, makes up the active element 24.

The gear comprises a reducer 50, a mechanism 52 for conversion of the motor rotation into translation, such as a ball screw, and link rods 54 connecting the mechanism 52 to a cam of the movable blade.

FIG. 3 also shows the electronic board 16, equipped with a microprocessor, the optical sensor 14, connected to the board through the electric connection 18, and the sensor 15 used to determine the position of the trigger. In this case, it is a hall effect sensor.

The electric motor 44 is driven by another electronic control board located in a power supply unit with an accumulator battery that is not shown. This electronic control board drives the motor based on controls transmitted by the electronic board 16 located inside the body of the pruning shear.

A connecting cord, not shown, ensures the electric connection with the power supply unit. The cord comprises electric conductors to drive the motor, the power supply of the electronic board power supply for the pruning shear, and the transfer of various control signals, for example through a serial link.

For the pruning shear 40, the main function control established by the board is, for example, a control of the rotation of the motor, and of its rotation direction, to initiate the movement of the movable blade toward the fixed blade, or inversely for the return of the movable blade to its open rest position.

The main function control can be a control of the maximum stroke setpoint for the movable blade. For example, to achieve a greater stroke. These operating modes are described above.

According to an especially advantageous improvement of the control device, shown in FIG. 3, the optical sensor 14 features a measurement field in a leading direction that coincides with an opening 33 made in the trigger. The opening takes here the form of a longitudinal slot extending over a part of the trigger, which accommodates one or more fingers of the user's hand.

Because of the opening 33, the trigger does not hinder the measurement of the optical sensor that can be done on the finger(s) used as target, like the device in FIG. 1.

The rest position of the trigger is preferably such that the finger is at the maximum proximate distance, i.e., at the end of the first range of distances whenever it is simply placed on the trigger in rest position. The trigger travels from the rest position toward the sensor 14 within the first range of distances. Such travel corresponds to the range for which the main function control is established. For a control of the additional function, the finger that makes up the target, moves away from the trigger in rest position.

The invention claimed is:

1. A control system for a piece of powered equipment having a motor, the control system comprising:
   at least one contactless optical sensor provided in an interface of the control system, the contactless optical sensor adapted to measure a distance separating at least one target located in an interface area and the contactless optical sensor;
   an electronic control board cooperative with the contactless optical sensor so as to control the motor based on at least one signal from the contactless optical sensor, said electronic control board configured to establish a first control of a main function of the piece of powered equipment when a signal from the contactless optical sensor is established for a measured distance within a first range of distance and to establish a control for an additional function of the piece of powered equipment when a signal from the contactless optical sensor is established for a measured distance greater than the first range of distances, the additional function being different than the main function; and
   a control element positioned in the interface area, said control element having a stroke limited to the first range of distances.

2. The control system of claim 1, further comprising:
   a position sensor linked to said control element, said position sensor connected to said electronic control board.

3. The control system of claim 1, said electronic control board being configured to establish the first control of the main function of the piece of powered equipment from the contactless optical sensor.

4. The control system of claim 1, wherein the target is a finger of the user, said control element comprising a trigger that is actuatable by the finger of the user, said trigger being located in a measurement field of the contactless optical sensor and having an opening in a support area for the finger of the user, the opening being aligned with the measuring field of the contactless optical sensor.

5. The control system of claim 1, the target comprising said control element.

6. The control system of claim 1, the piece of power equipment being a portable powered tool in which the control of the main function is a control in proportion to a rotation speed of the motor up to a maximum speed, wherein an additional control is at least one of a change control of a maximum rotation speed setpoint of the motor, a change control of an operating mode, a control for safety procedure, and a reversing control of a motor rotation direction.

7. The control system of claim 1, the piece of powered equipment being a tool selected from the group consisting of pruning shears and snips, the control of the main function being a rotation of a stroke of a movable blade of the tool between a maximum opening position defined by a setpoint and a closed position.

8. The control system of claim 7, wherein the control for the additional function is a change control of the maximum opening stroke setpoint for the movable blade.

9. A portable power tool in which the motor is a electric motor, the portable power tool having an active element and a transmission connecting the active element to the electric motor, the portable power tool having the control system of claim 1.

10. A control system for a piece of powered equipment having a motor, the control system comprising:
at least one contactless optical sensor provided in an interface of the control system, the contactless optical sensor adapted to measure a distance separating at least one target located in interface area and the contactless optical sensor;
an electronic control board cooperative with the contactless optical sensor so as to control the motor based on at least one signal from the contactless optical sensor, said electronic control board configured to establish a first control of a main function of the piece of powered equipment when a signal from the contactless optical sensor is established for a measured distance within a first range of distance and to establish a control for an additional function of the piece of powered equipment when a signal from the contactless optical sensor is established for a measured distance greater than the first range of distances, the additional function being different than the main function;
a control element positioned in the interface area; and
a position sensor linked to said control element, said positioned sensor connected to said electronic control board, wherein said electronic control board is configured to establish the first control of the main function of the powered equipment from a signal from the contactless optical sensor or the position sensor.

11. The control system of claim 10, the target being at least one finger of the user, said control element comprising a trigger actuatable by the finger of the user, said trigger having a maximum stroke between a released position and a depressed position, the first range of distances corresponding to a maximum stroke of said trigger.

12. A method of controlling a piece of powered equipment having a motor by an interface with an optical sensor that can measure a distance to at least one target, the method comprising:
establishing a first control of a main function for the piece of powered equipment whenever the target is a distance from the optical sensor within a first range of distances; and
establishing a control for at least one additional function of the piece of powered equipment that is different than the main function whenever the target is located at a distance from the optical sensor that is greater than the first range of distances, wherein the control of the main function is established from one of a distance measurement signal established by the optical sensor, a signal established by a position sensor linked to a control element of the control interface and a combination of signals from the signals of the optical sensor and from the position sensor.

* * * * *